Feb. 23, 1943.  I. E. ELM  2,311,650

CONTINUOUSLY ORIENTED MAP WITH POSITION INDICATING MEANS

Filed March 6, 1940  2 Sheets-Sheet 1

INVENTOR
IENAR E. ELM
BY
ATTORNEYS

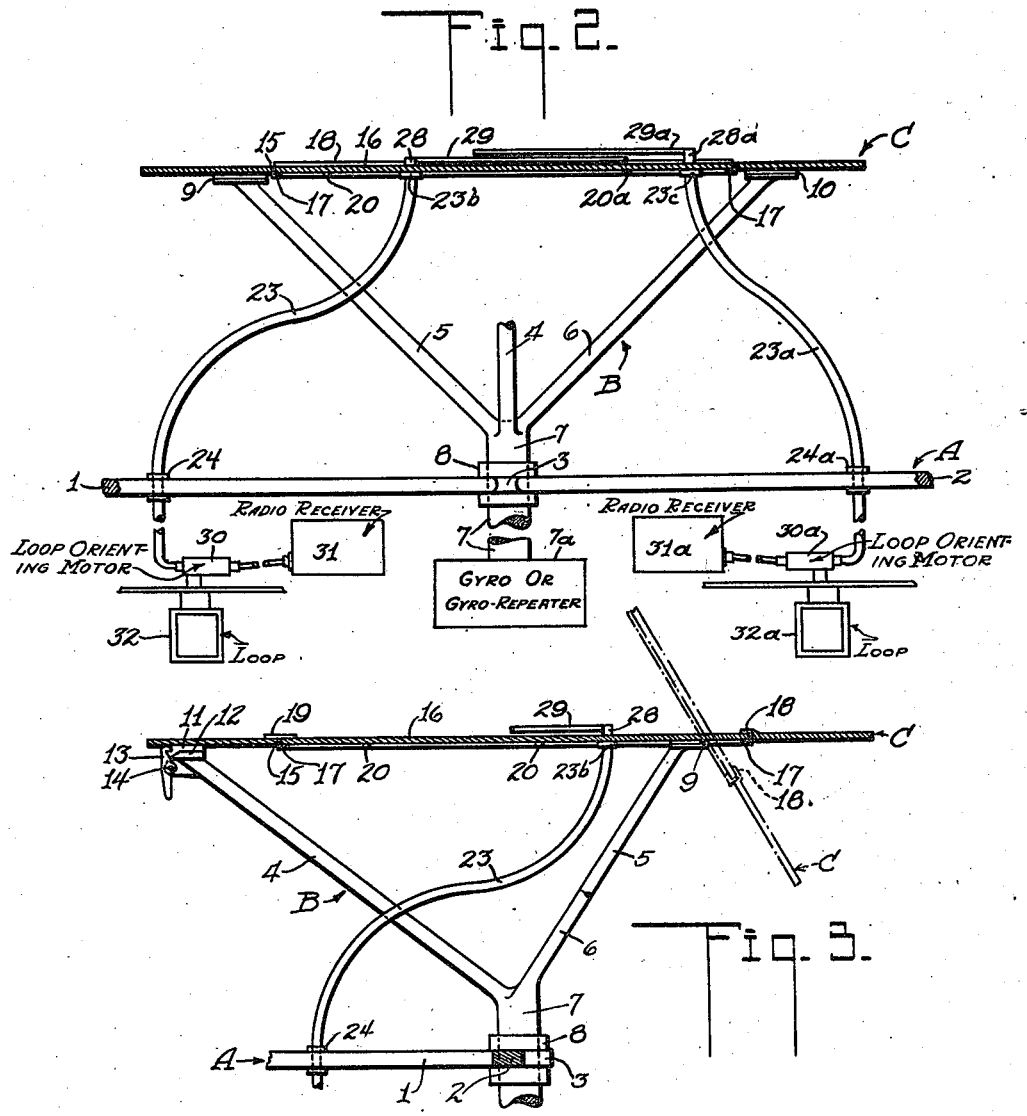

Patented Feb. 23, 1943

2,311,650

UNITED STATES PATENT OFFICE 2,311,650

CONTINUOUSLY ORIENTED MAP WITH POSITION INDICATING MEANS

Ienar E. Elm, Piedmont, Calif.

Application March 6, 1940, Serial No. 322,438

4 Claims. (Cl. 250—11)

The present invention relates to improvements in a continuously oriented map with position indicating means, and it consists in the combinations, constructions and arrangements hereinafter described and claimed.

An object of my invention is to provide a continuously oriented map with position indicating means, which is an improvement over my copending application on an Automatic continuous geographical position indicator, Serial No. 273,938, filed on May 16, 1939. In this copending case I show a frame supporting a turnable table, in which maps or charts are removably secured. The maps carry plugs that are placed in positions corresponding to actual locations of radio broadcasting stations. Direction indicating means, such as pointers, lights or shadows, are rotatably attachable to the desired plugs on the top surface of the map, while flexible shafts are removably connected to the same plugs from the undersurface of the map. The flexible shafts continuously rotate the direction indicating means in accordance with the changing positions of radio wave receiving means. The intersection of the direction indicating means will give the exact location on the map of the craft continuously in which the map and device are mounted.

No means are shown in the copending case for continuously and automatically orienting the map or chart and one of the objects of the present invention is to automatically and continuously orient the map so that the latter will always be pointing true north. The frame that supports the map-carrying platform permits ready and free access to the underside of the map. The platform is hinged for swinging the platform and map upwardly when it is desired to make a change in the flexible shafts from one plug to another; that is, from one point indicating a radio broadcasting station to another. The underside of the map is free from obstruction to permit the free interchange of the flexible shafts from one plug to another.

The maps or charts are removably held in the platform and may be readily changed as the craft or vessel proceeds along its course. The scales of the maps may vary as desired and the smaller the scale, the more accurate the reading is made possible by the intersection of the pointers, lights or shadows. In other words, a 1 to 100 map is far more accurate than a 1 to 100,000 map. The flexible shafts are preferably slidably received in sleeves, which are carried by the same base that supports the rotatable frame and platform. The ends of the flexible shafts that connect with plugs carry couplings, and these couplings prevent the shafts from entirely sliding through the sleeves when they are disconnected from the plugs during an interchange of maps or charts.

Other objects and advantages will appear as the specification proceeds, and the novel features of the device will be set forth in the appended claims.

My invention is illustrated in the accompanying drawings, forming part of this application, in which:

Figure 2 is a section taken along substantially the line 2—2 of Figure 1;

Figure 3 is a section taken substantially along the line 3—3 of Figure 1;

Figure 5 is a plan view of the underside of the pointers showing the ends of the flexible shafts in section.

While I have shown the preferred form of my invention, it should be understood that various changes or modifications may be made within the scope of the appended claims without departing from the spirit of the invention.

Figure 1:
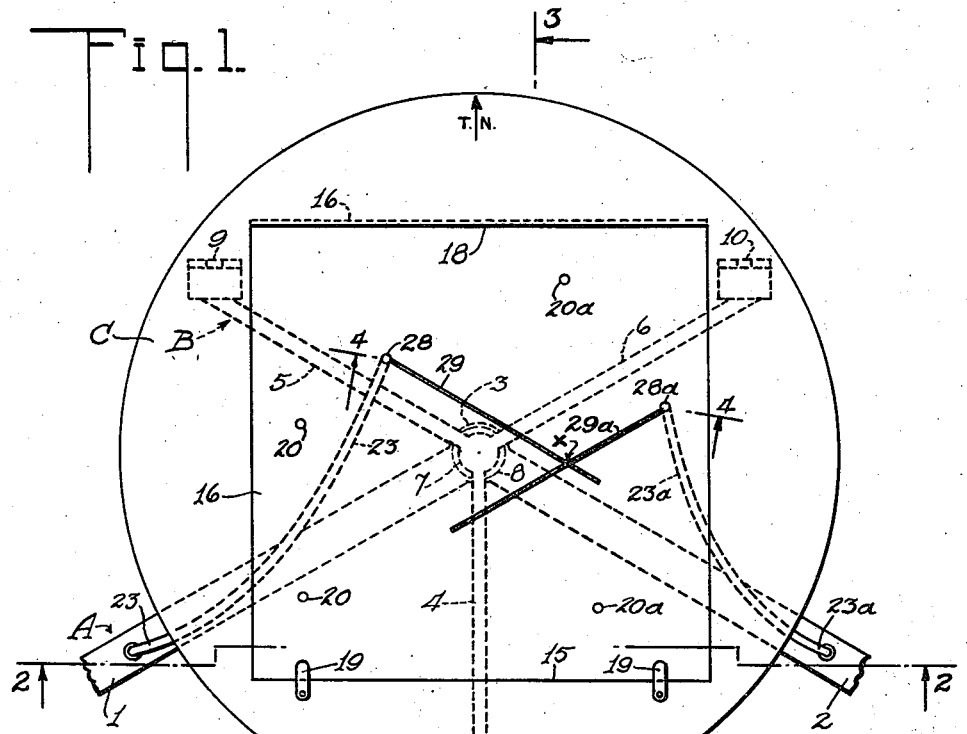
Figure 1 is a top plan view of the device.

In carrying out my invention I provide a base A, a rotatable frame B carried by the base, and a map-carrying platform C hinged to the frame. The base A may be of any construction desired. I have shown the base as comprising two radially-extending supports or legs 1 and 2 with a central portion 3. Figure 1 shows the legs 1 and 2 making an obtuse angle and permitting access to the frame B.

The frame B is in the shape of an inverted tripod with three arms 4, 5 and 6 extending upwardly and outwardly at an angle from a vertical extending and rotatable standard 7. The latter is rotatably supported by a bearing 8, which is carried by the central portion 3. The standard 7 is operatively connected to a gyro or a gyro repeater, indicated diagrammatically at 7a and is automatically rotated in synchrony therewith. Figure 2 shows the gyro or gyro repeater mechanically connected to the standard 7 and it is obvious that an electrical connection may be substituted, if desired.

The platform C is hingedly secured to the legs 5 and 6 of the frame B at 9 and 10, see Figures 1 and 3. The front portion of the platform carries a strike plate 11, see Figure 3; and this plate rests on a support 12. A latch 13 is pivotally carried by the leg 4 at 14 and yieldingly engages with the strike plate or keeper for holding the platform against accidental upward swinging about the hinges 9 and 10.

The platform has a central opening 15 for removably receiving a map or chart 16. The edge of the opening has a rim with an inwardly extending flange 17 for supporting the map. Figure 3 shows the upper edge of the opening provided with a shoulder 18 adapted to overlie the top edge of the map. Clips 19 are shown in Figures 1 and 3, which are pivoted to the platform C and swingable to overlie the map 16. In this way the maps or charts are removably secured in place.

Figure 4:
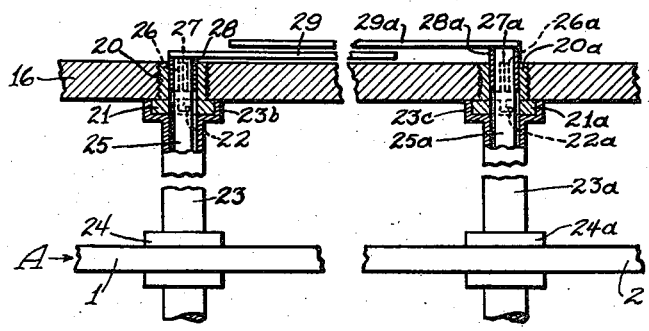
Figure 4 is an enlarged sectional view taken along the line 4—4 of Figure 1.

Each map or chart has a plurality of plugs 20 and 20a extending therethrough. Each plug is positioned on the map to give the exact location of a radio broadcastig station or other source of any radio signal. The map illustrates the territory being traversed by the craft and the radio stations in the territory are depicted in their exact locations on the map by the plugs. Two of the plugs 20 and 20a are shown in enlarged sectional detail in Figure 4. Both plugs have threaded portions screwed into threaded openings in the map 16, and the enlarged plug heads 21 and 21a carry radially extending pins 22 and 22a.

Flexible shafts, which have housings 23 and 23a, carry couplings 23b and 23c that are provided with bayonet slots for removably receiving pins 22 and 22a. The flexible housings 23 and 23a slidably extend through sleeves 24 and 24a, which in turn are carried by the legs 1 and 2, respectively. Each flexible housing rotatably carries a driving member and these are shown at 25 and 25a in Figures 4 and 5. The free ends of the members 25 and 25a have keyed sockets 26 and 26a for receiving correspondingly keyed members 27 and 27a centrally disposed in sleeves 28 and 28a. Pointers 29 and 29a are supported by the sleeves and the keyed members prevent the pointers from being connected to the driving members with 180° ambiguity.

In Figure 2 I show the flexible shafts 23 and 23a operatively connected to loop orienting motors, which are illustrated diagrammatically at 30 and 30a. Radio receivers 31 and 31a are operatively connected to the loop orienting motors, and the loops 32 and 32a oriented continually by the motors to be normal to the received radio waves. Each loop is brought to a null on the station to which the radio is tuned and this null is continuously and automatically maintained without 180° ambiguity.

From the foregoing description of the various parts of the device, the operation thereof may be readily understood. The device is made ready in the following manner:

The latch 13 is freed and the platform C swung upwardly about its hinges into the broken line position shown in Figure 3. The couplings 23b and 23c are disconnected from their plugs and the flexible shafts 23 and 23a will slip through the sleeves 24 and 24a until the couplings bear against the sleeves. The clips 19 are now turned to free the map or chart 16 and permit the insertion of the desired map. The new map is secured in place by the shoulder 18 and the clips 19. With the platform C still in an inclined position, the flexible shafts 23 and 23a are connected to the desired plugs 20 and 20a by the couplings 23b and 23c. The platform is now swung back into a horizontal position.

The operator tunes the radio receivers 31 and 31a to tune in the broadcasting stations corresponding to the plugs 20 and 20a that are connected to the flexible shafts 23 and 23a. The pointers 29 and 29a are connected to the same plugs and they will be swung in synchrony with the loops 32 and 32a. The loops are automatically and continuously rotating so that their planes will always remain normal to the incoming signals. The pointers 29 and 29a will at all times point from the broadcasting stations and the intersection of the pointers at X in Figure 1 will give the exact location of the craft with respect to the map 16. The pointers will move continuously and the intersection point X will trace the path of the craft, vessel, or vehicle over the map.

After the craft has moved a distance where it is desirable to tune in two other broadcasting stations, the platform is swung upwardly and the flexible shafts are connected to the plugs 20 and 20a representing the new stations. The pointers 29 and 29a are moved to the new plugs and the radio receivers are tuned to bring in the waves of the new stations. This procedure is repeated until the craft has moved across the entire area represented by the map, whereupon the map is removed and a new one substituted therefor in the manner already described for the first map.

During this entire operation, the standard 7 will automatically be kept rotating to always cause the arrow in Figure 1, designated by the letters "T. N.," to keep pointing to the true north. This is one of the principal features of the invention. The other feature is the shaping of the base A to give ready access to the underside of the platform C.

The frame B is designed to rotate the platform to keep the "T. N." arrow always pointing true north, and the frame gives freedom of access to the underside of the map 16. The flexible shafts 23 and 23a can be quickly changed from plug to plug, as required. The sleeves 24 and 24a need not be carried by the base A, but could be secured to some other support. The word "craft" includes any vehicle used for navigation or avigation of water, land, or air. The flexible shafts 23 and 23a may be connected directly to the loops 32 and 32a, if desired.

The term "radio broadcasting station," as used in the specification and claims, is to be construed broad enough to include the source of any radio signal which may send out signals as broadcasts, ranges, beams, etc. It is possible to case the loops 32 to assume a position in uniform relation to the source of signal, other than null, and the word "normal" in the claims is to include any practicable and operable position the loop maintains with respect to the signal source.

I claim:

1. In combination, a base having a central support with two legs extending radially therefrom and forming a wide angle therebetween, sleeves carried by the legs, a frame rotatably carried by the base, a platform hinged to the frame, a map removably secured to the platform and having plugs disposed at positions corresponding with locations of radio broadcasting stations included in the territory represented by the map, flexible shafts slidable in the sleeves and being connectible to the desired plugs from the underside of the map, the wide angle formed by the base legs permitting ready access thereto, and direction-indicating means swingable over the top of the map and being connected to the shafts.

2. In a device of the type described, a frame, a platform hingedly secured to the frame, a map removably carried by the platform and having openings therein representing the locations of broadcasting stations in the territory depicted by the map, pointers mounted on the face of the map and being swingable about any of the desired map openings as centers, flexible shafts removably secured to the pointers from the underside of the map and having portions passing through the openings associated with the pointers, said platform normally lying in a horizontal position and being swingable into an upright position for facilitating the manual changing of the flexible shafts from one set of openings to another whereupon the platform may again be swung into a normal position.

3. In combination, a base, a frame rotatably carried thereby and being operatively connected to a gyro or gyro-repeater for continually orienting the frame, a platform hingedly secured to the frame, a map removably carried by the platform and having plugs located in positions corresponding to broadcasting stations located in the territory represented by the map, flexible shafts connectible to the desired plugs at the underneath side of the map, direction indicating means connectible to the shafts and swingable over the top of the map, and means operatively connected to the shafts for continuously causing the direction indicating means to point away from the broadcasting stations represented by the plugs to which the shafts are connected, and to intersect each other, said platform normally lying in a horizontal position and being swingable into a vertical position for facilitating an operator in changing the flexible shafts from one set of plugs to another whereupon the platform may again be swung back into normal position.

4. In combination, a base, sleeves carried thereby, a tripod frame rotatably carried by the base, a platform hinged to the frame, a map removably secured to the platform and having plugs, flexible shafts slidable in the sleeves and being connectible to the desired plugs from the underside of the map, and direction indicating means swingable over the top of the map and being connected to the shafts.

IENAR E. ELM.